United States Patent [19]

Dehnert et al.

[11] 4,210,583
[45] Jul. 1, 1980

[54] AZO DYES OF THE 2,6-DI(SUBSTITUTED) AMINO PYRIDINE SERIES

[75] Inventors: Johannes Dehnert, Ludwigshafen; Walter Kurtz, Bad Duerkheim; Gunther Lamm, Hassloch, all of Fed. Rep. of Germany

[73] Assignee: BASF Aktiengesellschaft, Ludwigshafen, Fed. Rep. of Germany

[21] Appl. No.: 928,967

[22] Filed: Jul. 28, 1978

[30] Foreign Application Priority Data

Aug. 3, 1977 [DE] Fed. Rep. of Germany ....... 2734927

[51] Int. Cl.$^2$ .................. C09B 29/36; D06P 1/18; D06P 3/26; D06P 3/54
[52] U.S. Cl. .................................. 260/156; 544/286; 544/298; 548/131
[58] Field of Search ......................................... 260/156

[56] References Cited

U.S. PATENT DOCUMENTS

| Re. 29,640 | 5/1978 | Lamm et al. ............... 260/156 X |
| 3,923,777 | 12/1975 | Dimroth et al. ............ 260/157 |
| 3,998,802 | 12/1976 | Dehnert et al. ............ 260/156 |
| 4,083,686 | 4/1978 | Dimroth et al. ............ 260/152 |

FOREIGN PATENT DOCUMENTS

| 2101558 | 7/1972 | Fed. Rep. of Germany ........... 260/157 |
| 2457687 | 6/1976 | Fed. Rep. of Germany ........... 260/156 |

*Primary Examiner*—Floyd D. Higel
*Attorney, Agent, or Firm*—Oblon, Fisher, Spivak, McClelland & Maier

[57] ABSTRACT

An azo dye of the general formula where
A is cyano or carbamoyl,
R is hydrogen, alkyl or phenyl,
$R^1$ is hydrogen, bromine, chlorine or nitro,
$R^2$ is hydrogen, chlorine, bromine, nitro, methyl, trifluoromethyl, sulfamoyl, N-monoalkyl- or N,N-dialkylsulfamoyl (where alkyl is of 1 to 4 carbon atoms), or a sulfonic acid phenyl ester, methylphenyl ester, chlorophenyl ester or methoxyphenyl ester group,
$R^3$ is hydrogen or alkyl of 1 to 8 carbon atoms which may be interrupted by oxygen and may be substituted by hydroxyl, pyrrolidonyl, phthalimidyl, alkoxy of 1 to 8 carbon atoms, allyloxy, benzyloxy, phenylethoxy, phenoxy, methylphenoxy, chlorophenoxy, methoxyphenoxy, or optionally substituted arylsulfonyl, or is benzyl, phenylethyl or cyclohexyl, or is phenyl which is unsubstituted or substituted by chlorine, bromine, nitro, methyl, ethyl, methoxy, ethoxy, phenoxy or dialkylamino (where alkyl is of 1 to 4 carbon atoms), or is naphthyl, pyridyl, thienyl or furyl,
the substituents $B^1$ independently of one another are hydrogen or an aliphatic, cycloaliphatic, araliphatic, aromatic, heterocyclic or acyl radical and
$B^2$ is hydrogen or an aliphatic radical.

The dyes may be used for dyeing synthetic fibers, especially polyesters, and cellulose/polyester union fabrics, and give very fast dyeings.

14 Claims, No Drawings

AZO DYES OF THE 2,6-DI(SUBSTITUTED) AMINO PYRIDINE SERIES

SUMMARY OF THE INVENTION

The present invention relates to a dye of the general formula I

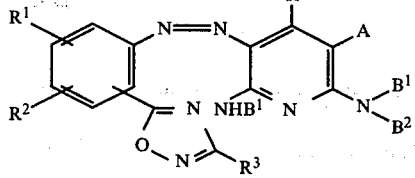

where
A is cyano or carbamoyl,
R is hydrogen, alkyl or phenyl,
$R^1$ is hydrogen, chlorine, bromine, or nitro,
$R^2$ is hydrogen, chlorine, bromine, nitro, methyl, trifluoromethyl, sulfamoyl, N-monoalkyl- or N,N-dialkylsulfamoyl (where alkyl is of 1 to 4 carbon atoms), or a sulfonic acid phenyl ester, methylphenyl ester, chlorophenyl ester or methoxyphenyl ester group,
$R^3$ is hydrogen or alkyl of 1 to 8 carbon atoms which may be interrupted by oxygen and may be substituted by hydroxyl, pyrrolidonyl, phthalimidyl, alkoxy of 1 to 8 carbon atoms, allyloxy, benzyloxy, phenylethoxy, phenoxy, methylphenoxy, chlorophenoxy, methoxyphenoxy, or optionally substituted arylsulfonyl, or is benzyl, phenylethyl or cyclohexyl, or is phenyl which is unsubstituted or substituted by chlorine, bromine, nitro, methyl, ethyl, methoxy, ethoxy, phenoxy or dialkylamino (where alkyl is of 1 to 4 carbon atoms), or is naphthyl, pyridyl, thienyl or furyl,
the substituents $B^1$ independently of one another are hydrogen or an aliphatic, cycloaliphatic, araliphatic, aromatic, heterocyclic or acyl radical and $B^2$ is hydrogen or an aliphatic radical.

DESCRIPTION OF THE PREFERRED EMBODIMENTS

Alkyl R is, for example, methyl, ethyl, propyl, butyl or pentyl.

Radicals $B^1$ independently of one another are, for example, hydrogen, alkyl of 1 to 18 carbon atoms, alkyl of 2 to 8 carbon atoms which may be interrupted by ether-oxygen and is substituted by hydroxyl, alkoxy of 1 to 8 carbon atoms, benzyloxy, β-phenylethoxy, phenoxy, tolyloxy, cyclohexyloxy or cyano, cycloalkyl of 5 to 8 carbon atoms, hydroxycyclohexyl, β-hydroxyethoxycyclohexyl, polycycloalkyl of 7 to 12 carbon atoms, hydroxynorbornyl, hydroxymethylnorbornyl or hydroxyethylnorbornyl or chloromethylnorbornyl, phenylalkyl or tolylalkyl, where alkyl is of 1 to 4 carbon atoms, phenyl which is unsubstituted or substituted by chlorine, hydroxyl, methoxy, ethoxy, methyl, ethyl or hydroxyethoxy, allyl, pyrrolidonylalkyl, where alkyl is of 2, 3, 4 or 6 carbon atoms, carboxyalkyl, where alkyl is of 2 to 5 carbon atoms,

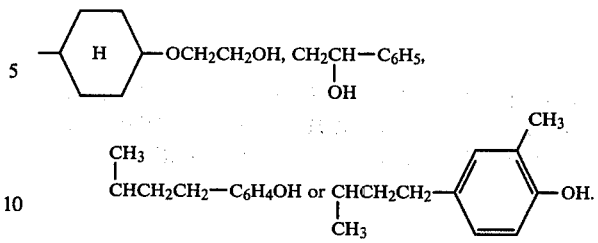

Examples of $B^2$ are the same aliphatic radicals as those given for $B^1$, and the same remarks apply, within the scope of the general definition, to $R^3$. $R^3$ may in addition be, for example, phenylsulfonylmethyl, tolylsulfonylmethyl, methoxyphenylsulfonylmethyl, chlorophenylsulfonylmethyl or bromophenylsulfonylmethyl.

Examples of individual radicals $B^1$, $B^2$ and $R^3$ (to the extent that they fall under the general definition) are, in addition to those already mentioned:

1. Unsubstituted or substituted alkyl: $CH_3$, $C_2H_5$, n- and i-$C_3H_7$, n- and i-$C_4H_9$, $C_6H_{13}$,

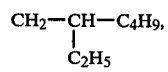

$CH_2CH_2OH$, $(CH_2)_3OH$,

$(CH_2)_4OH$, $(CH_2)_6OH$,

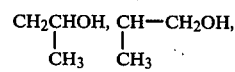

$(CH_2)_2O(CH_2)_2OH$, $(CH_2)_3O(CH_2)_4OH$, $(CH_2)_3OC_2H_4OH$, $(CH_2)_2CN$, $(CH_2)_5CN$, $(CH_2)_6CN$, $(CH_2)_7CN$, $(CH_2)_2O(CH_2)_2CN$, $(CH_2)_3O(CH_2)_2CN$, $(CH_2)_2O(CH_2)_2O(CH_2)_2CN$, $(CH_2)_3OC_2H_4OCH_3$, $(CH_2)_3OC_2H_4OC_2H_5$, $(CH_2)_3O(CH_2)_6OH$, $(CH_2)_3OC_2H_4OCH(CH_3L)_2$, $(CH_2)_3OC_2H_4OC_4H_9$, $(CH_2)_3OC_2H_4OCH_2C_6H_5$, $(CH_2)_3OC_2H_4OC_2H_4C_6H_5$,

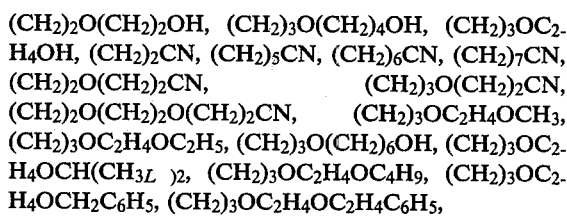

$(CH_2)_3OC_2H_4OC_6H_5$,

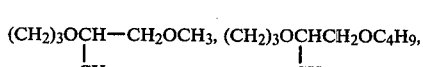
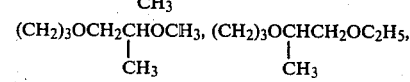

the corresponding radicals which contain two or three of the groups $-OC_2H_4$,

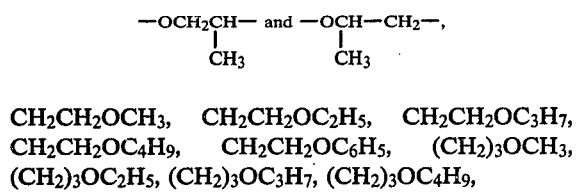

CH₂CH₂OCH₃, CH₂CH₂OC₂H₅, CH₂CH₂OC₃H₇, CH₂CH₂OC₄H₉, CH₂CH₂OC₆H₅, (CH₂)₃OCH₃, (CH₂)₃OC₂H₅, (CH₂)₃OC₃H₇, (CH₂)₃OC₄H₉,

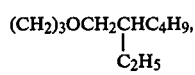

(CH₂)₃OC₆H₁₃, (CH₂)₃OC₈H₁₇, (CH₂)₃O—, (CH₂)₃OCH₂C₆H₅, (CH₂)₃OC₂H₄C₆H₅, (CH₂)₃OC₆H₅,

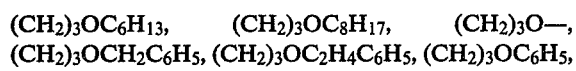
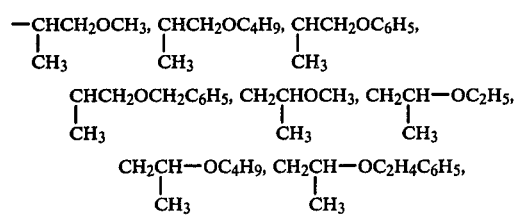
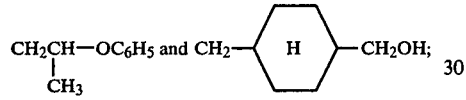

2. Substituted and unsubstituted cycloalkyl and polycycloalkyl:

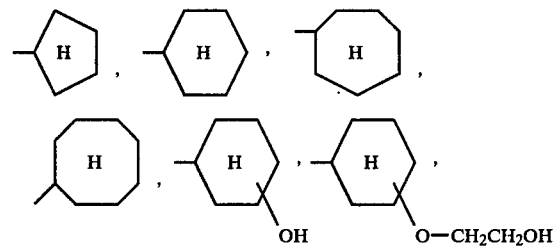

3. Aralkyl:

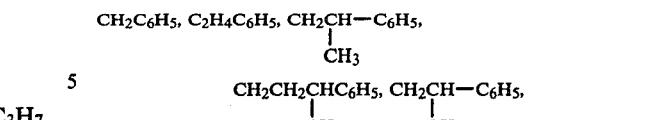
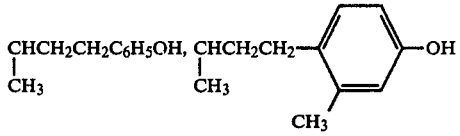

and corresponding radicals which contain C₆H₄CH₃ instead of C₆H₅;

4. Substituted or unsubstituted phenyl: C₆H₅, C₆H₄CH₃, C₆H₃(CH₃)₂, C₆H₄OCH₃, C₆H₄OC₂H₅, C₆H₄OH,

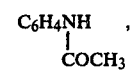

C₆H₄OCH₂CH₂OH and C₆H₄Cl;

5. CH₂CH=CH₂, (CH₂)₂COOH, (CH₂)₅COOH and

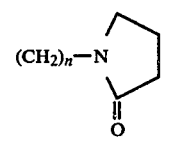

where n is 2, 3, 4 or 6, C₂H₄OCOCH₃, C₂H₄OCHO, C₂H₄OCOCH₃, (C₂H₄O)₂COCH₃, (C₂H₄O)₂CHO, (CH₂)₃OCOCH₃, (CH₂)₃OCHO and C₂H₄OCOC₂H₄COOH.

Further examples of R³ are CH₂OCH₃, CH₂OC₂H₄, CH₂OC₃H₇, CH₂OC₄H₉, CH₂OCH₂CH=CH₂, CH₂OCH₂C₆H₅ and CH₂OC₆H₅.

Examples of preferred substituents B¹ and B² are hydrogen, CH₃, C₂H₅, n- and i-C₃H₇, n- and i-C₄H₉, C₆H₁₃, CH₂CH₂OH, (CH₂)₃OH,

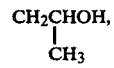

(CH₂)₄OH, (CH₂)₆OH,

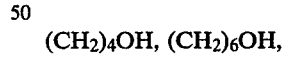

(CH₂)₂O(CH₂)₂OH, (CH₂)₃O(CH₂)₂OH, (CH₂)₃O(CH₂)₄OH, (CH₂)₃O(CH₂)₆OH,

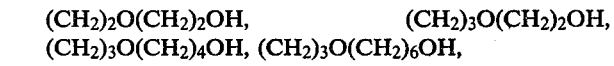
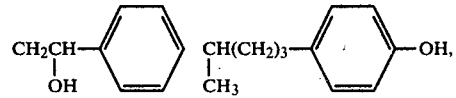

-continued

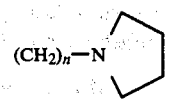  (n = 2,3 or 6),

CH₂CH₂OCH₃, CH₂CH₂OC₂H₅, CH₂CH₂OC₄H₉,
(CH₂)₃OCH₃, (CH₂)₃OC₂H₅, (CH₂)₃OC₃H₇,
(CH₂)₃OC₄H₉,

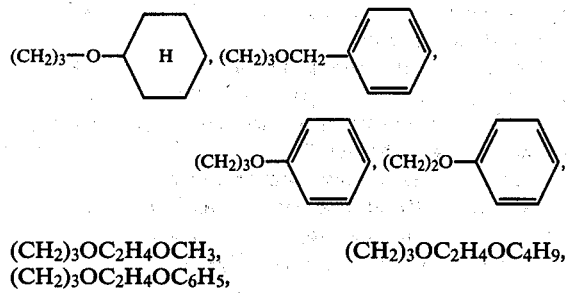

(CH₂)₃OC₂H₄OCH₃, (CH₂)₃OC₂H₄OC₄H₉,
(CH₂)₃OC₂H₄OC₆H₅,

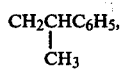

CH₂C₆H₅, C₂H₄C₆H₅,

C₆H₅, C₆H₄CH₃, C₆H₄OCH₃ and C₆H₄OC₂H₄OH.
Examples of radicals $$N{<}^{B^1}_{B^2}$$

are pyrrolidino, piperidino, morpholino and N-methylpiperazino.

Examples of some preferred diazo components are:

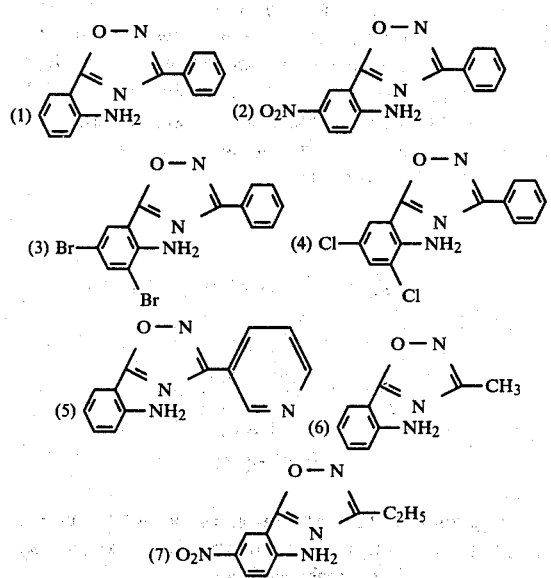

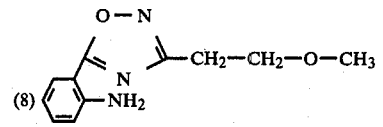

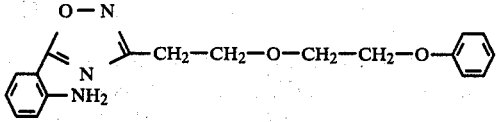

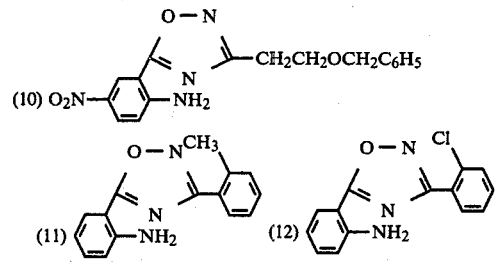

On cellulose fibers, natural polyamides and synthetic nylons, polyesters and other synthetic fibers the dyes of the formula I give yellow to red dyeings with very good lightfastness, fastness to thermofixing and fastness to wet treatments. The tinctorial strength and the clear hues achievable with many of the dyes deserve particular mention.

Dyes of the formula given in claim 1 which are of particular industrial importance are those where A is cyano or carbamoyl, R is hydrogen or alkyl of 1 to 3 carbon atoms, R¹ is hydrogen, chlorine, bromine or nitro, R² is hydrogen, chlorine, bromine, nitro, methyl, trifluoromethyl, sulfamoyl, N-monosubstituted or N,N-disubstituted alkylsulfamoyl, where alkyl is of 1 to 4 carbon atoms, or a sulfonic acid phenyl ester, methylphenyl ester, chlorophenyl ester or methoxyphenyl ester group, R³ is hydrogen or alkyl of 1 to 8 carbon atoms which is unsubstituted or substituted by hydroxyl, alkoxy of 1 to 8 carbon atoms, allyloxy, phenoxy, methylphenoxy, chlorophenoxy or methoxyphenoxy, or is benzyl, phenylethyl or cyclohexyl, or is phenyl which is unsubstituted or substituted by chlorine, bromine, nitro, methyl, ethyl, methoxy, ethoxy or phenoxy, or is naphthyl, pyridyl, thienyl or furyl, or is

—X—(O—Y)ₙOT

X is alkylene of 1 to 3 carbon atoms,

Y is alkylene of 2 or 3 carbon atoms, n is 1 or 2,

T is hydrogen, alkyl of 1 to 4 carbon atoms, benzyl, phenylethyl, phenyl or tolyl, B¹ is hydrogen, alkyl of 1 to 8 carbon atoms, alkyl of 2 to 8 carbon atoms which is substituted by hydroxyl, alkoxy of 1 to 8 carbon atoms, phenoxy, tolyloxy, phenyl, alkanoyloxy of 1 to 8 carbon atoms, alkoxycarbonyl (where alkoxy is 1 to 8 carbon atoms), alkylaminocarbonyloxy (where alkyl is of 1 to 4 carbon atoms) or phenylaminocarbonyloxy, or cyclohexyl, norbornyl, allyl, phenyl, tolyl or chlorophenyl, or

—Y—(O—Y)ₙ—OT and

B² is hydrogen or alkyl of 1 to 4 carbon atoms which is unsubstituted or substituted by hydroxyl or by alkoxy of 1 to 4 carbon atoms.

Preferably, R is hydrogen or methyl and B² is hydrogen. A further preferred combination is where R is H and A is CONH₂.

The preferred meanings of B¹ are those given above.

The dye of the formula I may be prepared by reacting a diazonium compound of an amine of the formula

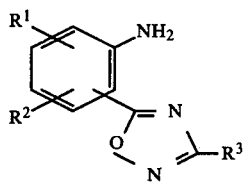

with a coupling component of the formula

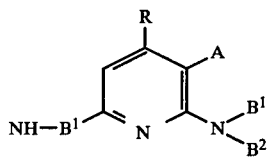

Diazotization and coupling are carried out in accordance with conventional methods.

In the Examples which follow, parts and percentages are by weight, unless stated otherwise.

EXAMPLE 1

24 parts of the compound of the formula (1) (see above) are dissolved in 250 parts by volume of glacial acetic acid and 50 parts by volume of propionic acid. 32 g of 40% strength nitrosylsulfuric acid are added dropwise at 0°–5° C. and the mixture is then stirred for 2 hours at 0°–5° C. The excess nitrous acid is then destroyed in the conventional manner by adding urea.

The diazotized mixture thus obtained is introduced, at 0°–5° C., into a mixture obtained by dissolving 28 parts of 2-(ω-hydroxy-butoxyamino)-6-amino-3-cyano-4-methylpyridine in 500 parts of water by means of 15 parts of 10 N hydrochloric acid and adding 250 parts of ice.

Sufficient saturated sodium acetate solution is then added dropwise to the coupling mixture to produce complete coupling at a pH of from 4 to 5.

The resulting dye is filtered off, washed with water and dried at 100° C. The powder obtained gives a yellow solution in N-methylpyrrolidone or dimethylformamide and on polyester or nylon fabrics gives yellow dyeings of very good lightfastness and great fastness to thermofixing.

EXAMPLE 2

A solution of 27 parts of 2,6-bis-(methoxyethylamino)-3-cyano-4-methylpyridine in 100 parts by volume of glacial acetic acid is added, at 0°–5° C., to the diazotized mixture obtained as described in Example 1, paragraph 1, and 500 parts by volume of a saturated sodium acetate solution are then added.

The resulting dye is filtered off, washed with water and ethanol and dried at 100° C. The product is a yellow powder which gives a yellow solution in N-methylpyrrolidone. On polyester or cotton fabrics or polyester/cotton union fabrics, yellow prints of very good lightfastness and wetfastness are obtained.

EXAMPLE 3

32 parts of 40 percent strength nitrosylsulfuric acid are added, at 0°–5° C., to a solution of 28 parts of the compound of the formula 2 (see list of diazo components on page 5) in 100 parts by volume of concentrated sulfuric acid. After stirring for 2 hours at 0°–5° C., the excess nitrous acid is destroyed in the conventional manner by adding urea.

The resulting mixture is run gradually, at 0°–5° C., into a mixture of 27 parts of 2,6-bis-(methoxyethylamino)-3-cyano-4-methylpyridine, 3,000 parts by volume of N-methylpyrrolidone and 500 parts of ice.

After completion of coupling, the dye is filtered off, washed with ethanol and dried. The dark red powder gives a red solution in N-methylpyrrolidone and produces fast bluish red prints on polyester and on cotton.

EXAMPLE 4

14.8 parts of the diazo component of the formula

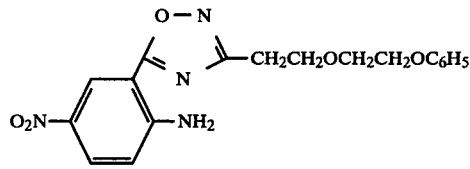

are stirred into a mixture of 70 parts of glacial acetic acid, 10 parts of propionic acid and 5 parts by volume of sulfuric acid and after cooling to 5° C., 14 parts of 40% strength nitrosylsulfuric acid are added whilst cooling. The diazotized mixture is then stirred for 70 minutes at 0°–5° C. Thereafter, the diazonium salt solution is run into a solution, cooled to 0°–5° C., of 8.05 parts of 2,6-bis-ethylamino-3-cyano-4-methylpyridine in 600 parts by volume of water and 8 parts by volume of concentrated hydrochloric acid. After raising the pH of the mixture to 2.0–2.2 by means of dilute sodium acetate solution or sodium hydroxide solution, the coupling reaction is soon complete. The mixture is heated to 60°–70° C. and the product is filtered off and washed salt-free with water at 60°–70° C. After drying, 22.5 parts of a dark brown powder, which gives a bluish red solution in N-methylpyrrolidone, are obtained.

The dye has the formula

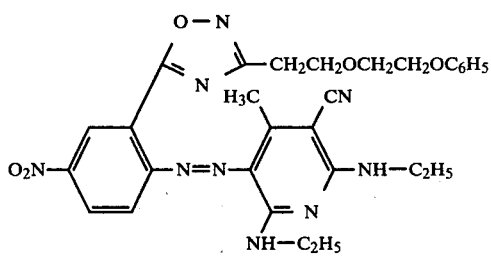

The dye gives fast bluish red prints on polyester and on cotton, and dyes polyester by the HT process, at 125°–140° C., in fast bluish red hues.

EXAMPLE 5

12.7 parts of the compound of the formula

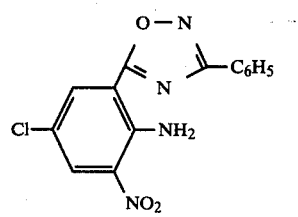

are introduced, at 0°–5° C., into a mixture of 26.4 parts of 96–98% strength sulfuric acid, 13.5 parts of 42% strength nitrosylsulfuric acid, 20 parts of propionic acid and 120 parts of glacial acetic acid. The mixture is then stirred for 3.5 hours at 0°–5° C. The finished diazonium salt mixture is run into a solution, cooled to 0°–5° C., of 11.6 parts of 2,6-bis-methoxypropylamino-3-cyano-4-methylpyridine in 600 parts by volume of water and 10 parts by volume of concentrated hydrochloric acid. The coupling reaction is completed rapidly on raising the pH to 2.0–2.2 by means of dilute sodium hydroxide solution. The mixture is stirred for 1 hour and then heated to 70° C., and the dye which has precipitated is filtered off, washed salt-free with water, and dried. 23 parts of a yellowish red powder of the formula

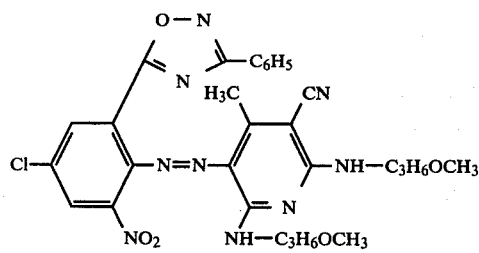

are obtained.

The dye gives a red solution in N-methylpyrrolidone and dyes polystyrene in lightfast golden yellow to orange hues.

EXAMPLE 6

14.0 parts of the diazo component of the formula

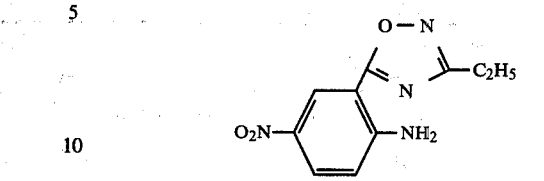

are dissolved in 200 parts by volume of glacial acetic acid at 50°–55° C. 2 parts of an emulsifier and 150 parts of ice are added. The mixture is then acidified with 18 parts by volume of concentrated hydrochloric acid at 0°–5° C., after which 21 parts by volume of a 23% strength aqueous sodium nitrite solution are added dropwise. The diazotization reaction is complete after stirring for 2 hours and a clear solution is obtained, which is combined with a solution, cooled to 5° C., of 17.6 parts of 2,6-bis-methoxypropylamino-3-cyano-4-methylpyridine in 600 parts by volume of water and 13 parts by volume of concentrated hydrochloric acid. After raising the pH to 2, the mixture is stirred for 30 minutes, after which it is heated to 70° C. and the dye which has precipitated is filtered off, washed salt-free with water and dried. 31.5 parts of a dark brown powder of the formula

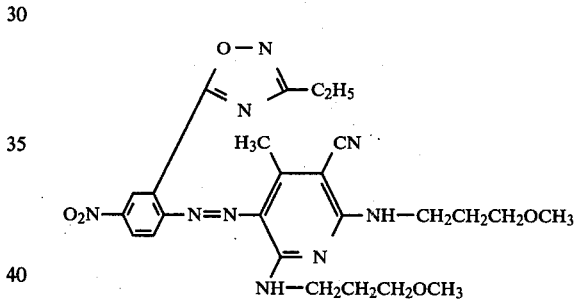

are obtained. This product gives a bluish red solution in dimethylformamide and produces fast bluish red prints on polyester and on cotton. Polyester can be dyed with the dye by the HT process or thermosol process.

The following dyes can be obtained by methods similar to those described in the preceding Examples:

| No. | Diazo component | Coupling component | Hue on polyester or cotton |
|---|---|---|---|
| 7 | Diazo component of the formula 2 | ![H3C, CN, NH—(CH2)3—O—CH3, NH—(CH2)3—O—CH3 pyridine structure] | red |
| 8 | Diazo component of the formula 2 | ![H3C, CN, NH—CH2—CH2—O—CH3, NH2 pyridine structure] | red |

-continued

| No. | Diazo component | Coupling component | Hue on polyester or cotton |
|---|---|---|---|
| 9 | Diazo component of the formula 2 | H₃C, CN, —NH(CH₂)₃O(CH₂)₂O—C₆H₅, =N, NH₂ (pyridine ring) | red |
| 10 | Diazo component of the formula 4 | H₃C, CN, —NH(CH₂)₃O(CH₂)₂O—C₆H₅, =N, NH₂ (pyridine ring) | yellow |
| 11 | Diazo component of the formula 4 | H₃C, CN, —NH—(CH₂)₃—OCH₃, =N, NH—(CH₂)₃—OCH₃ (pyridine ring) | yellow |
| 12 | Diazo component of the formula 4 | H₃C, CN, —NH—CH₂CH₂OCH₃, =N, NH—CH₂CH₂C₆H₅ (pyridine ring) | yellow |
| 13 | Diazo component of the formula 1 | H₃C, CN, —NH—(CH₂)₂—C₆H₅, =N, NH—(CH₂)₂—C₆H₅ (pyridine ring) | yellow |
| 14 | Diazo component of the formula 1 | H₃C, CN, —NH(CH₂)₃O(CH₂)₂O—C₆H₅, =N, NH₂ (pyridine ring) | yellow |
| 15 | Diazo component of the formula 1 | H₃C, CN, —NHCH₂CH₂OCH₂CH₂OH, =N, NH₂ (pyridine ring) | yellow |
| 16 | Diazo component of the formula 3 | H₃C, CN, —NHCH₂CH₂OCH₃, =N, NHCH₂CH₂OCH₃ (pyridine ring) | yellow |

-continued

| No. | Diazo component | Coupling component | Hue on polyester or cotton |
|---|---|---|---|
| 17 | Diazo component of the formula 3 | 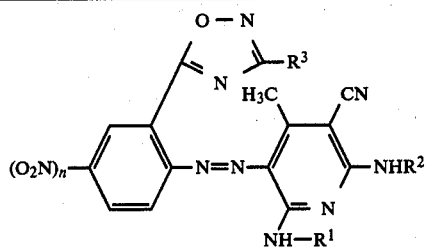 | yellow |

TABLE 1

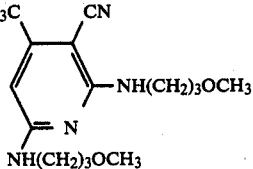

| No. | $R^1$ | $R^2$ | $R^3$ | n | Hue on polyester |
|---|---|---|---|---|---|
| 18 | CH$_2$CH$_2$OCOCH$_3$ | CH$_2$CH$_2$OCOCH$_3$ | C$_6$H$_5$ | 0 | yellow |
| 19 | " | " | " | 1 | red |
| 20 | CH$_2$CH$_2$OCOC$_2$H$_5$ | CH$_2$CH$_2$OCOC$_2$H$_5$ | " | 0 | yellow |
| 21 | " | " | " | 1 | red |
| 22 | CH$_2$CH$_2$OCOOC$_2$H$_5$ | CH$_2$CH$_2$OCOOC$_2$H$_5$ | " | 0 | yellow |
| 23 | " | " | " | 1 | red |
| 24 | CH$_2$CH$_2$OCONHC$_6$H$_5$ | CH$_2$CH$_2$OCONHC$_6$H$_5$ | " | 0 | yellow |
| 25 | " | " | " | 1 | red |
| 26 | CH$_2$CH$_2$OCONHC$_4$H$_9$ | CH$_2$CH$_2$OCONH—C$_4$H$_9$ | " | 0 | yellow |
| 27 | " | " | " | 1 | red |
| 28 | CH$_2$CH$_2$OCH$_3$ | CH$_2$CH$_2$OCH$_3$ | " | 0 | yellow |
| 29 | H | " | " | 0 | yellow |
| 30 | " | (CH$_2$)$_3$O(CH$_2$)$_2$OC$_6$H$_5$ | -C$_6$H$_4$-CH$_3$ (p) | 0 | yellow |
| 31 | H | (CH$_2$)$_3$O(CH$_2$)$_2$OC$_6$H$_5$ | CH$_3$ | 1 | red |
| 32 | " | " | C$_2$H$_5$ | 1 | red |
| 33 | " | (CH$_2$)$_3$O(CH$_2$)$_4$OH | " | 1 | red |
| 34 | " | " | (CH$_2$)$_2$OCH$_3$ | 1 | red |
| 35 | " | (CH$_2$)$_3$O(CH$_2$)$_2$OC$_6$H$_5$ | " | 1 | red |
| 36 | CH$_2$CH$_2$OCH$_3$ | " | " | 1 | red |
| 37 | " | " | C$_2$H$_5$ | 1 | red |
| 38 | CH$_2$CH$_2$OH | " | " | 1 | red |
| 39 | CH$_2$CH$_2$OCH$_3$ | " | C$_6$H$_5$ | 1 | red |
| 40 | " | C$_4$H$_9$(n) | " | 1 | red |
| 41 | " | (CH$_2$)$_2$OCH$_3$ | CH$_2$CH$_2$OCH$_3$ | 1 | red |
| 42 | " | " | CH$_2$CH$_2$OC$_2$H$_5$ | 1 | red |
| 43 | (CH$_2$)$_3$OCH$_3$ | (CH$_2$)$_3$OCH$_3$ | " | 1 | red |
| 44 | " | " | CH$_2$CH$_2$OCH$_3$ | 1 | red |
| 45 | " | " | CH$_2$CH$_2$C$_6$H$_5$ | 1 | red |
| 46 | " | " | CH$_3$ | 1 | red |
| 47 | " | C$_4$H$_9$(n) | C$_6$H$_5$ | 1 | red |
| 48 | CH$_2$CH$_2$OCH$_3$ | (CH$_2$)$_3$O(CH$_2$)$_2$OC$_6$H$_5$ | -C$_6$H$_4$-CH$_3$ (p) | 1 | red |
| 49 | " | CH$_2$CH$_2$OCH$_3$ | " | 1 | red |
| 50 | (CH$_2$)$_3$OCH$_3$ | (CH$_2$)$_3$OCH$_3$ | " | 1 | red |
| 51 | CH$_2$CH$_2$OCH$_3$ | " | " | 1 | red |
| 52 | C$_4$H$_9$(n) | C$_4$H$_9$(n) | " | 1 | red |
| 53 | C$_2$H$_5$ | C$_3$H$_7$(n) | (CH$_2$)$_2$O(CH$_2$)$_2$OC$_6$H$_5$ | 1 | red |
| 54 | " | C$_2$H$_5$ | " | 0 | yellow |
| 55 | C$_3$H$_7$(n) | " | " | 0 | yellow |
| 56 | " | " | " | 1 | red |
| 57 | CH$_2$CH$_2$OCH$_3$ | (CH$_2$)$_3$OCH$_3$ | C$_2$H$_5$ | 1 | red |
| 58 | " | " | CH$_2$CH$_2$CH$_3$ | 1 | red |
| 59 | " | CH$_2$CH$_2$OCH$_3$ | " | 1 | red |

TABLE 1-continued

[Structure: dye with oxadiazole group, nitrophenyl-N=N- linked to pyridine with H3C, CN, NHR2, NH-R1 substituents]

| No. | R¹ | R² | R³ | n | Hue on polyester |
|---|---|---|---|---|---|
| 60 | (CH₂)₃OCH₃ | (CH₂)₃OCH₃ | " | 1 | red |
| 61 | CH(CH₃)CH₂CH₂OCH₃ | " | " | 1 | red |
| 62 | " | CH(CH₃)CH₂CH₂OCH₃ | " | 1 | red |
| 63 | CH(CH₃)CH₂CH₂OCH₃ | CH(CH₃)CH₂CH₂OCH₃ | C₂H₅ | 1 | red |
| 64 | (CH₂)₃OCH₃ | (CH₂)₃OCH₃ | C₄H₉(n) | 1 | red |
| 65 | " | " | 4-OCH₃-C₆H₄ | 1 | red |
| 66 | " | " | 4-OCH₃-C₆H₄ | 0 | yellow |
| 67 | " | " | 4-Cl-C₆H₄ | 1 | red |
| 68 | C₄H₉(n) | C₄H₉(n) | " | 1 | red |
| 69 | H | CH₂—CH(C₂H₅)—C₄H₉(n) | CH₂CH₂OCH₃ | 0 | yellow |
| 70 | CH₂CH₂OCOCH₃ | CH₂CH₂OCOCH₃ | (CH₂)₂O(CH₂)₂OC₆H₅ | 1 | red |
| 71 | " | " | " | 0 | yellow |
| 72 | (CH₂)₃OCH₃ | (CH₂)₃OCH₃ | 3-pyridyl | 0 | yellow |
| 73 | " | " | " | 1 | red |

TABLE 2

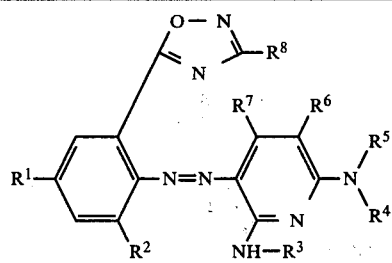

| No. | R¹ | R² | R³ | R⁴ | R⁵ | R⁶ | R⁷ | R⁸ | Hue on cotton |
|---|---|---|---|---|---|---|---|---|---|
| 74 | Br | Br | (CH₂)₂OCH₃ | (CH₂)₂OCH₃ | (CH₂)₂OCH₃ | CN | CH₃ | C₆H₅ | yellow |
| 75 | " | " | " | " | H | " | H | " | yellow |
| 76 | H | H | " | " | (CH₂)₂OCH₃ | " | " | (CH₂)₂O(CH₂)₂OC₆H₅ | yellow |

TABLE 2-continued

[Structure diagram showing a compound with substituents R¹, R², R³, R⁴, R⁵, R⁶, R⁷, R⁸ on a phenyl-azo-pyridine system with an oxadiazole ring]

| No. | R¹ | R² | R³ | R⁴ | R⁵ | R⁶ | R⁷ | R⁸ | Hue on cotton |
|---|---|---|---|---|---|---|---|---|---|
| 77 | " | " | (CH₂)₃OCH₃ | H | (CH₂)₃OCH₃ | " | CH₃ | ![]—SO₂NH—C₄H₉(n) | yellow |
| 78 | O₂N | " | " | (CH₂)₂OCH₃ | (CH₂)₂OCH₃ | " | " | C₂H₅ | red |
| 79 | " | Cl | " | H | (CH₂)₃OCH₃ | " | " | C₆H₅ | dull bluish red |
| 80 | " | Br | " | " | " | " | " | " | dull bluish red |
| 81 | " | H | " | " | " | CONH₂ | H | " | dull bluish red |
| 82 | NO₂ | NO₂ | " | (CH₂)₃OCH₃ | H | CN | CH₃ | " | violet |
| 83 | O₂N | H | C₂H₅ | H | C₂H₅ | CONH₂ | H | (CH₂)₂O(CH₂)₂OC₆H₅ | dull bluish red |
| 84 | " | " | " | " | " | CN | CH₃ | (CH₂)₂OCH₂C₆H₅ | red |
| 85 | " | " | " | " | " | " | " | (CH₂)₂OCH₂CH₂C₆H₅ | red |
| 86 | " | " | " | " | " | " | " | (CH₂)₂OC₆H₅ | red |
| 87 | " | " | (CH₂)₃OCH₃ | " | (CH₂)₃OCH₃ | " | " | CH₂—C₆H₅ | red |
| 88 | " | " | (CH₂)₂OCH₃ | " | (CH₂)₂OCH₃ | " | " | " | red |
| 89 | " | " | (CH₂)₃OCH₃ | " | (CH₂)₃OCH₃ | " | " | ![]—NHCO—C₆H₅ | red |
| 90 | H | H | (CH₂)₂—N(piperidone) | H | (CH₂)₂—N(piperidone) | " | " | C₆H₅ | red |
| 91 | CF₃ | H | (CH₂)₂—OCH₃ | H | (CH₂)₂—OCH₃ | " | " | " | golden yellow |
| 92 | CF₃ | H | (CH₂)₃—OCH₃ | H | (CH₂)₃—OCH₃ | " | " | " | yellowish orange |

TABLE 2-continued

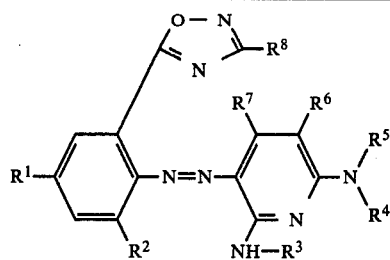

| No. | R¹ | R² | R³ | R⁴ | R⁵ | R⁶ | R⁷ | R⁸ | Hue on cotton |
|---|---|---|---|---|---|---|---|---|---|
| 93 | $CF_3$ | H | H | H | $(CH_2)_3$—O—$(CH_2)_4$—OH | " | " | " | golden yellow |

TABLE 3

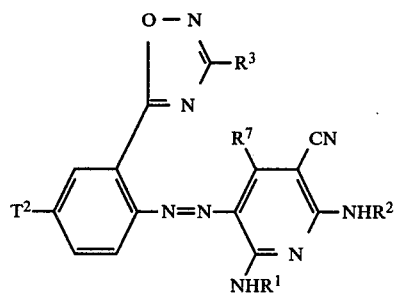

| No. | T² | R³ | R⁷ | R¹ | R² | Hue |
|---|---|---|---|---|---|---|
| 94 | $CF_3$ | $C_6H_5$ | H | $CH_2CH_2OCH_3$ | $CH_2CH_2OCH_3$ | golden yellow |
| 95 | $(C_2H_5)_2NO_2S$— | " | $CH_3$ | " | " | orange |
| 96 | " | " | " | $(CH_2)_3OCH_3$ | $(CH_2)_3OCH_3$ | " |
| 97 | " | " | " | $C_4H_9(n)$ | $C_4H_9(n)$ | " |
| 98 | $C_6H_5O_3S$— | $CH_3$ | " | " | " | " |
| 99 | " | $C_2H_5$ | " | $(CH_2)_3OCH_3$ | $(CH_2)_3OCH_3$ | " |
| 100 | $O_2N$— | $CH_2OCH_3$ | " | " | " | bluish |
| 101 | " | " | H | " | " | " |
| 102 | " | " | $C_2H_5$ | " | " | " |
| 103 | " | " | $CH_3$ | $C_4H_9(n)$ | $C_4H_9(n)$ | " |
| 104 | " | " | " | $C_3H_7(n)$ | $C_3H_7(n)$ | " |
| 105 | $O_2N$— | $CH_2OCH_3$ | $CH_3$ | $C_2H_5$ | $C_2H_5$ | bluish red |
| 106 | " | $CH_2OC_6H_5$ | " | " | " | bluish red |
| 107 | " | " | " | $C_4H_9(n)$ | $C_4H_9(n)$ | bluish red |
| 108 | " | $CH_2CH_2OC_3H_7(n)$ | " | " | " | red |
| 109 | " | " | " | $C_3H_7(n)$ | $C_3H_7(n)$ | " |
| 110 | " | " | " | $C_2H_5$ | $C_2H_5$ | " |
| 111 | " | " | " | $(CH_2)_3OCH_3$ | $(CH_2)_3OCH_3$ | bluish red |
| 112 | " | $Ch_2CH_2OC_2H_5$ | $Ch_3$ | $C_2H_5$ | $C_2H_5$ | red |
| 113 | " | " | " | $C_3H_7(n)$ | $C_3H_7(n)$ | " |
| 114 | " | " | " | " | $(CH_2)_3OCH_3$ | " |
| 115 | " | " | " | $CH_2CH=CH_2$ | $CH_2CH=CH_2$ | " |
| 116 | " | " | " | $C_4H_9(n)$ | $C_4H_9(n)$ | " |
| 117 | " | " | " | $(CH_29_2OCH_3$ | $(CH_2)_3OCH_3$ | " |
| 118 | " | " | " | $C_2H_5$ | $C_6H_{13}(n)$ | " |
| 119 | " | " | " | " | $C_6H_{13}(i)$ | " |
| 120 | $O_2N$— | $CH_2OCH_3$ | $CH_3$ | $C_2H_5$ | $C_6H_{13}(i)$ | red |
| 121 | " | $CH_2OC_2H_5$ | " | $C_3H_7(n)$ | $C_3H_7(n)$ | red |
| 122 | " | " | " | $C_4H_9(n)$ | $C_4H_9(n)$ | " |
| 123 | " | " | " | $(CH_2)_3OCH_3$ | $(CH_2)_3OCH_3$ | " |

TABLE 3-continued

| | | | | | | |
|---|---|---|---|---|---|---|
| 124 | " | CH2—CH—OCH3 \| CH3 | " | " | " | " |
| 125 | " | CH2Ch2OC4H9(n) | " | " | " | " |
| 126 | " | " | " | C2h5 | C2H5 | " |
| 127 | " | " | " | C2H7(n) | C3H7(n) | " |
| 128 | " | CH2CH2OC6H13(n) | " | C2H5 | C2H5 | " |
| 129 | " | " | " | " | " | " |
| 130 | " | CH2CH2—O—⟨H⟩ | " | C3H7(n) | C3H7(n) | " |
| 131 | " | " | " | (CH2)3OCH3 | (CH2)3OCH3 | " |
| 132 | " | H | " | C4H9(n) | C4H9(n) | " |
| 133 | " | " | " | (CH2)2OCH3 | (CH2)3OCH3 | " |
| 134 | " | CH2CH2OCH2CH2OC4H9(n) | CH3 | C2H5/C2h5 | " | |
| 135 | " | " | " | C3H7(n) | C3H7(n) | " |

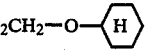

| Ex. | X | R | R¹ | R² | hue |
|---|---|---|---|---|---|
| 144 | —SO2N(C2H5)2 | C6H5 | C2H4C6H5 | C2H4C6H5 | orange |
| 145 | " | " | C2H4OCH3 | " | " |
| 146 | " | " | (CH2)3OC2H4OC6H5 | H | " |
| 147 | Cl | " | " | H | " |
| 148 | 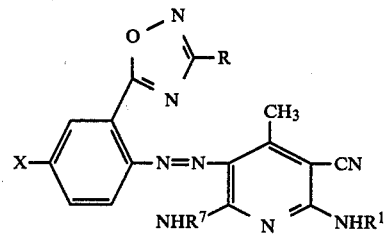 | " | C2H4OCH3 | C2H4OCH3 | " |
| 149 | " | " | C3H6OCH3 | C3H6OCH3 | " |
| 150 | H | CH2SO2—⟨⟩—CH3 | " | " | yellow |
| 151 | H | CH2SO2C6H5 | " | " | " |
| 152 | NO2 | " | " | " | red |
| 153 | " | CH3 | C2H4C6H5 | C2H4C6H5 | " |
| 154 | " | C2H5 | " | " | " |
| 155 | " | CH2OCH3 | " | " | " |
| 156 | " | C2H4OCH3 | " | " | " |
| 157 | " | C2h4OC3H7(n) | " | " | " |
| 158 | " | " | C2H4OCONHC4h9(n) | C2h5 | " |
| 159 | " | C2H4OCH3 | " | " | " |
| 160 | " | C2H4OC3H7(n) | C2h4OCONHC6h5 | " | " |

| No. | T² | R³ | R⁷ | R¹ | R² | hue |
|---|---|---|---|---|---|---|
| 161 | O2N— | CH2CH2OCH2CH2OC4H9(n) | CH3 | C4h9(n) | C4H9(n) | red |
| 162 | " | " | " | (CH2)3OCH3 | (CH2)3OCH3) | " |
| 163 | " | CH2CH2(OCH2CH2)2OC4H9(n) | CH3 | C2H5 | C2H5 | " |
| 164 | " | " | " | C3H7(n) | C3h7(n) | " |
| 165 | " | " | " | C4H9(n) | C4H9(n) | " |
| 166 | " | C6h5 | " | H | (CH2)3O(CH2)2OC6H5 | " |
| 167 | Cl | " | " | " | (CH2)3O(CH2)4OH | golden yellow |
| 168 | Br | " | " | (CH293OCH3 | (CH2)3OCH3 | orange |

What is claimed as new and intended to be covered by Letters Patent is:

1. A compound of the formula

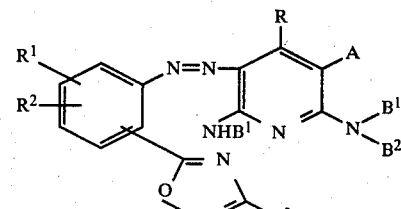

where
- A is cyano or carbamoyl,
- R is hydrogen or alkyl of 1 to 3 carbon atoms,
- $R^1$ is hydrogen, chlorine, bromine or nitro,
- $R^2$ is hydrogen, chlorine, bromine, nitro, methyl, trifluoromethyl, sulfamoyl, N-monoalkyl- or N,N-dialkylsulfamoyl, where alkyl is of 1 to 4 carbon atoms, or a sulfonic acid phenyl ester, methylphenyl ester, chlorophenyl ester or methoxyphenyl ester group,
- $R^3$ is selected from the group consisting of hydrogen, alkyl of 1 to 8 carbon atoms which is unsubstituted or substituted by hydroxyl, alkoxy of 1 to 8 carbon atoms, allyloxy, phenoxy, methylphenoxy, chlorophenoxy, methoxyphenoxy, or optionally substituted arylsulfonyl; benzyl; phenylethyl; cyclohexyl; phenyl which is unsubstituted or substituted by chlorine, bromine, nitro, methyl, ethyl, methoxy, ethoxy or phenoxy; naphthyl; pyridyl; thienyl; furyl; and —X—(O—Y)$_n$—OT wherein
- X is alkylene of 1 to 3 carbon atoms,
- Y is alkylene of 2 or 3 carbon atoms,
- n is 1 or 2,
- T is hydrogen, alkyl of 1 to 4 carbon atoms, benzyl, phenylethyl, phenyl or tolyl,
- $B^1$ is hydrogen, alkyl of 1 to 8 carbon atoms, alkyl of 2 to 8 carbon atoms which is substituted by hydroxyl, alkoxy of 1 to 8 carbon atoms, phenoxy, tolyloxy, phenyl, alkanoyloxy of 1 to 8 carbon atoms, $C_1$ to $C_4$ alkoxycarbonyl, $C_1$ to $C_4$ alkylaminocarbonyloxy or phenylaminocarbonyloxy, or cyclohexyl, norbornyl, allyl, phenyl, tolyl or chlorophenyl, or —Y—(O—Y)$_n$—OT and $B^2$ is hydrogen or alkyl of 1 to 4 carbon atoms which is unsubstituted or substituted by hydroxy or by alkoxy of 1 to 4 carbon atoms.

2. A compound as claimed in claim 1, where A is cyano.

3. A compound as claimed in claim 1, where R is hydrogen or methyl.

4. A compound as claimed in claim 1, where $R^1$ is hydrogen, chlorine or nitro and $R^2$ is hydrogen or chlorine.

5. A compound as claimed in claim 1 where $R^3$ is selected from the group consisting of alkyl of 1 to 4 carbon atoms; alkyl of 1 to 3 carbon atoms which is substituted by alkoxy of 1 to 8 carbon atoms; phenyl which is unsubstituted or substituted by chlorine or methyl.

6. A compound as claimed in claim 1, where $B^1$ is hydrogen, alkyl of 2 to 6 carbon atoms, allyl, alkyl of 2 or 3 carbon atoms which is substituted by alkoxy of 1 to 4 carbon atoms, phenylethyl, cyclohexyl or

Y—O—Y—OT$^1$ $T^1$ is alkyl of 1 to 4 carbon atoms, benzyl, phenylethyl, phenyl or tolyl and Y has the stated meaning.

7. A compound as claimed in claim 1, of the formula

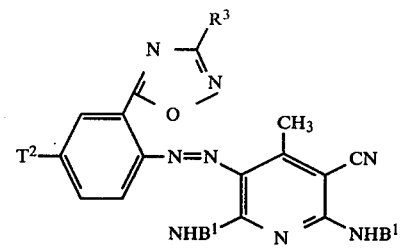

where $T^2$ is hydrogen, chlorine or nitro and $B^1$ and $R^3$ have the stated meanings.

8. A compound as claimed in claim 1, of the formula

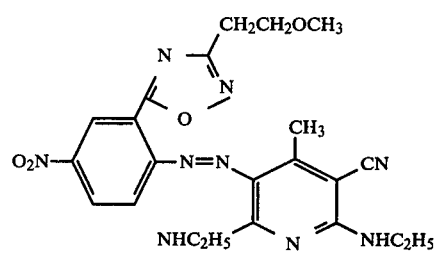

9. A compound as claimed in claim 1, of the formula

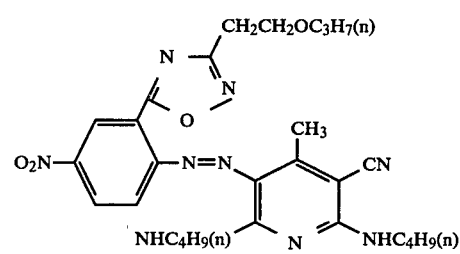

10. A compound as claimed in claim 1, of the formula

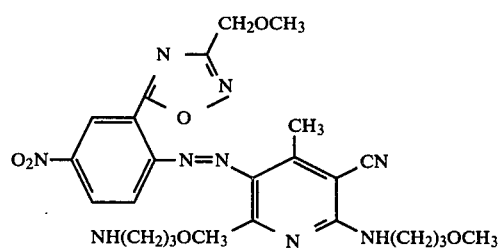

11. A compound as claimed in claim 1, of the formula

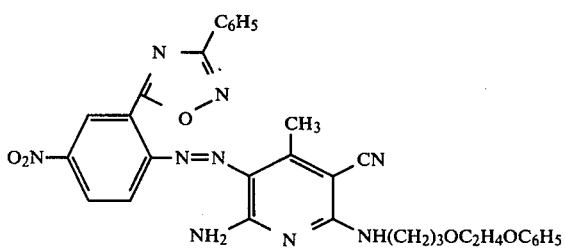

12. A compound as claimed in claim 1, of the formula
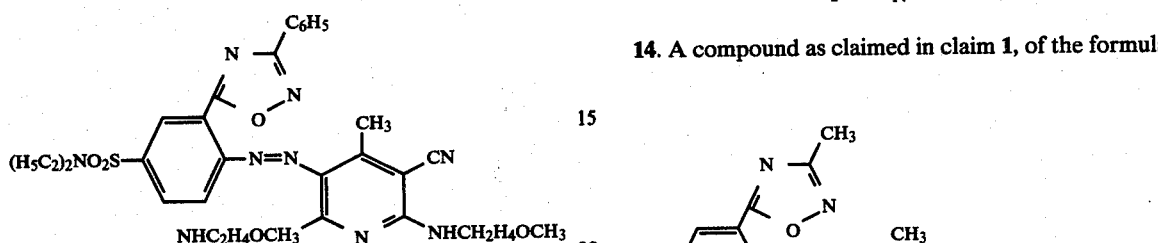
13. A compound as claimed in claim 1, of the formula
14. A compound as claimed in claim 1, of the formula
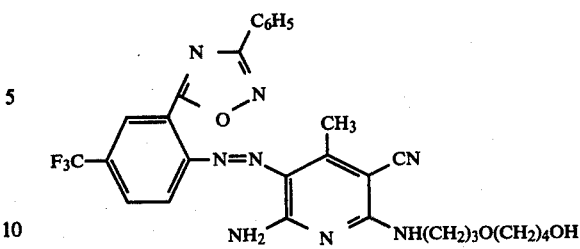
* * * * *